Figure 1:
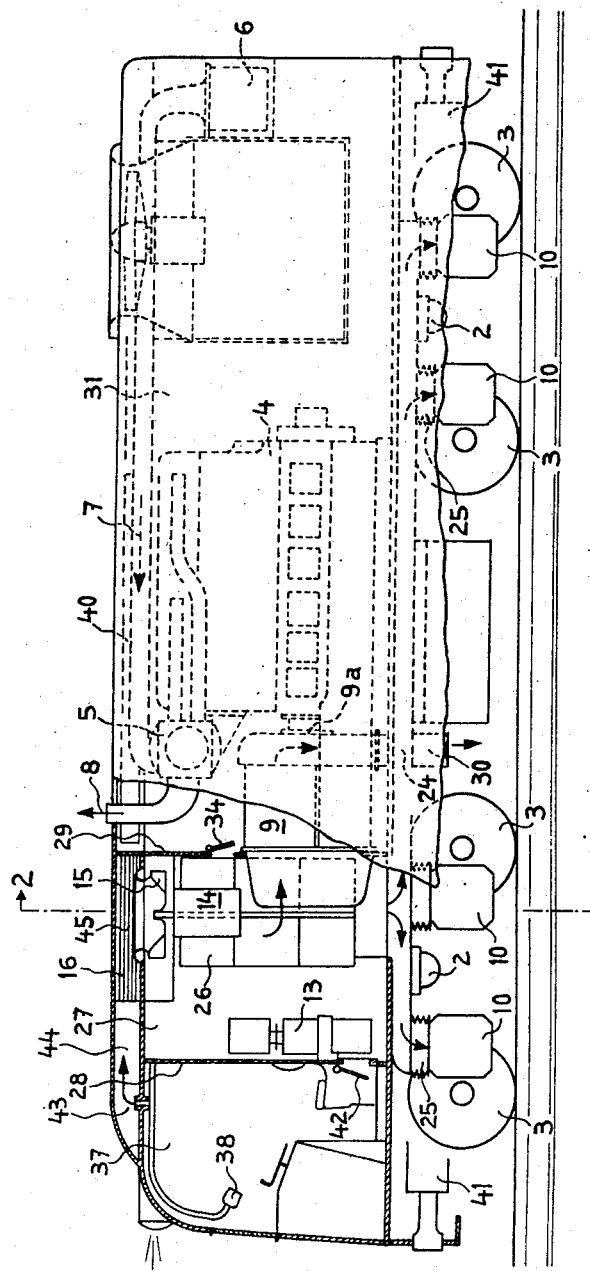

Jan. 19, 1954

A. WEBER 2,666,497

VENTILATING AND FILTERING SYSTEM FOR
DIESEL-ELECTRIC DRIVEN LOCOMOTIVES

Filed June 29, 1951

2 Sheets-Sheet 1

INVENTOR.
ARNOLD WEBER

BY

ATTORNEY

Arnold Weber
INVENTOR.

Patented Jan. 19, 1954

2,666,497

UNITED STATES PATENT OFFICE 2,666,497

VENTILATING AND FILTERING SYSTEM FOR DIESEL-ELECTRIC DRIVEN LOCOMOTIVES

Arnold Weber, Winterthur, Switzerland, assignor to Schweizerische Lokomotiv- und Maschinenfabrik, Winterthur, Switzerland Application June 29, 1951, Serial No. 234,278

Claims priority, application Switzerland July 1, 1950

4 Claims. (Cl. 183—36)

1

This invention relates to a ventilating system for self-propelled vehicles and in particular to internal combustion engine driven electric locomotives, for example diesel-electric driven, for use in tropical climates and in sand containing atmospheres.

It is an object of the invention to provide a unitary ventilating system in such self-propelled vehicles by which the prime mover and the various items of the electrical transmission equipment of the vehicles are cooled during operation by cleansed air even though the ventilating air is drawn into the vehicle from an external atmosphere which is sand or dust laden.

It is a further object of the invention to provide a unitary ventilating system for self-propelled vehicles by which not only the operating driving equipment is ventilated but also the various compartments of the vehicle.

Still a further object is to provide such a system in which the portion of the ventilating air which may in the ventilating action become contaminated within the vehicle by oil vapors from the internal combustion engine is prevented from reaching any equipment which may be imperilled thereby and is ejected from the vehicle rather directly.

Still another object of the invention is to provide a unitary ventilating system for such self-propelled vehicles in which at least a portion of the ventilating air remaining relatively uncontaminated in the ventilation may be recirculated indefinitely through the system.

The use of two mutually independent blower systems, with associated filters, for ventilating the internal combustion engine and the electrical generator coupled thereto, respectively the electric motor driving the vehicle propulsion axles, is prior known. In the first mentioned system of the two, the ventilating air stream is generated by a venting wheel on the generator, is directed therefrom to the compartment housing the internal combustion prime mover, and emerges from the compartment by vent holes in the skylight turret, roof, or side walls thereof. But as such ventilating air coming from the generator has been heated in its passage therethrough, the cooling effect leaves much to be desired, especially when operating in tropical climates. A further shortcoming of such prior system is that, particularly when the locomotive is stationary, air containing oil vapor flows from the engine compartment to the generator coils where it may attack the insulation.

In another prior known arrangement, simplification of the system for ventilating the electrical equipment and the engine compartment is obtained by the use of one filter and one blower. In such embodiment, the entire mass of required ventilating air is distributed through a chute, enclosed by longitudinal and transverse walls, one portion of the air stream being passed through the generator into the compartment housing the internal combustion engine, while the other portion is conveyed by ducts to the axle driving motors. Such system also has the same defects of inadequate cooling of the engine compartment and of imperilling the generator coils by the oil vapors contained in the ventilating air coming from the engine compartment. A further defect of this system is that the single air strainer or filter associated with the blower must be relatively large, particularly if the vehicle is to be used in rather dusty regions, since there is but a single fine-mesh filter for all the ventilating air required.

The system of the instant invention attains the foregoing stated, as well as other obvious, objects by giving more adequate consideration to the factors primarily involved in such ventilating system, such as, for example, the maximum permissible dust content and temperature of the ventilating air stream in respect of the particular items to be ventilated thereby, than has been had in the prior known systems, while at the same time eliminating the above mentioned shortcomings of the prior known systems. This is accomplished by the provision of a single fan or blower which draws the air to be used for ventilating from the external atmosphere into a main air shaft or duct in which there is a first filter through which all the air used for ventilating must pass. By the action of this filter a goodly portion of the sand or dust contained in the air as drawn in is eliminated. Beyond the first filter, the duct divides into two main branches, one of which leads directly to the axle driving motors to be ventilated and the other of which leads to a second filter of fine mesh and into a pressure compartment which is distinct from the compartment housing the internal combustion engine. The ventilating air reaching the pressure compartment is substantially freed, by the added action of the second filter, of all extraneous matter, such as dust, sand and water, and passes under its own pressure to the various other compartments such as the engine room and the engineer's driving compartment, as well as through the electrical generator.

Figure 2:
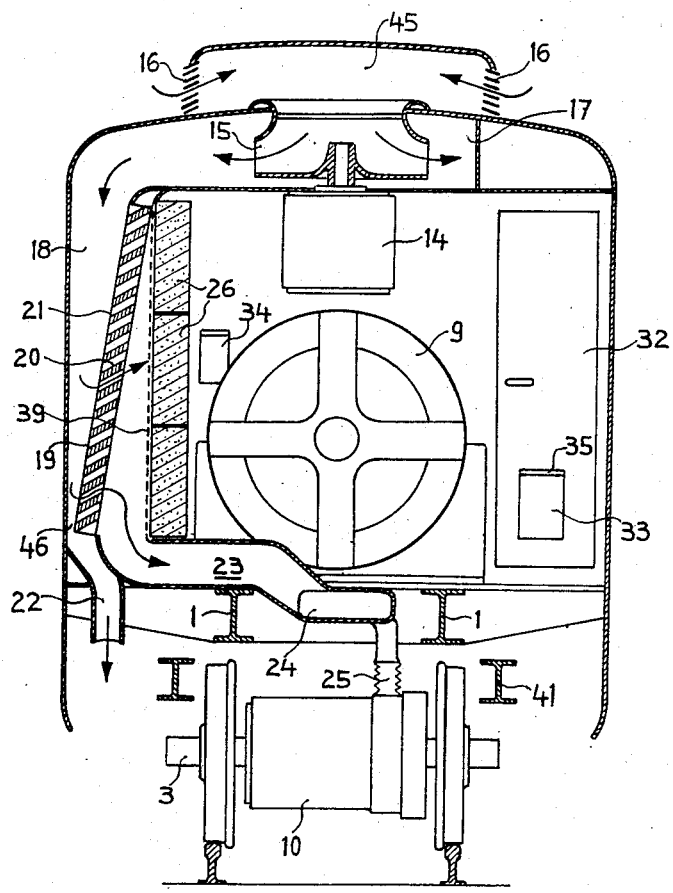

A more complete understanding of the various objects and features of the invention may be obtained from the following detailed description when read in conjunction with the accompanying drawing in which Figure 1 is a longitudinal elevational view with parts broken away and parts being shown in section, and Figure 2 a cross-section along line 2—2 of Figure 1, both rather general so as to show more clearly the essential features of the invention, of a diesel-electric locomotive adapted for use in tropical climates and in atmospheres containing sand.

The locomotive housing, carried by the two longitudinal beams 1, is supported by means of a plurality of pivots 2 on the two swivel trucks mounting the driving axles and wheels 3. The associated turning frame 41 and the locomotive housing supporting springs are merely indicated, respectively not shown, in the drawing for additional clarity. The prime mover is shown as a diesel engine 4 with a supercharger 5 which draws the air for combustion through two strainers or filters 6, serving the engine installation, and the intake ducts 7, and passes it under compression to the diesel engine 4. The gaseous combustion products are ejected through the exhaust pipe 8.

Essentially the electrical power system comprises the self-ventilating generator 9, directly coupled to the diesel engine, the four power axle driving motors 10 on the trucks which are vented externally by means forming a part of the ventilating system of the invention, and the necessary control devices, resistances, cables, etc., which are not shown. The potential transformer for the control current is designated 13.

All the air, required for ventilating the electrical equipment and the individual compartments of the locomotive housing, is drawn from the external atmosphere by the fan or blower 15, driven by the electric motor 14, through the openings 16 in the roof turret and passes from the spiral shaped receiving duct 17 into the shaft 18 under an over-pressure of, for example, about 4 inches of water. Diagonally across a lengthwise section of the shaft 18, and extending for example substantially the height of the locomotive housing, a latticed air filter or strainer 19 is provided with a plurality of plates or guides 20 positioned so as to impart a substantially reversed direction to the air stream in its passage through the filter 19 as compared to the direction it had on reaching the filter. The filter 19 is positioned diagonally in such a manner that in the direction of the air flow to the filter, the cross sectional area of the stream in shaft 18 which has not passed through the filter gradually decreases to a minimum. Thus, in the exemplary embodiment, filter 19 is in the vertical portion of the shaft 18 and positioned diagonally from the upper right (interior wall) to the lower left (approaching the exterior wall of the locomotive housing) and the parallel reversing guides 20 extend longitudinally the vehicle and are directed from the bottom left upwardly to the right. As the individual air particles of the stream enter the filter 19, the lower edges 21 of the deflecting plates 20 sharply divert them, with the result that substantially all the foreign matter in the air stream, such as drops of water and particles of sand, are ejected to a very marked degree percentagewise and fall downwardly and, together with a limited amount of the air in shaft 18, are ejected through the port 46 into the external atmosphere downwardly in a powerful flow through the port 22. Thus the main filtering or straining of the ventilating air has been completed.

After the stream of air has passed through the dynamic filter 19, it is divided into two main portions. One of these portions, intended for the ventilation of the power axle driving motors 10, passes into the transverse duct 23 and through the longitudinal duct 24 to the bellows ducts 25 and into the housings of motors 10 from which it is ultimately expelled to the external atmosphere. It will be noted that the system is so designed and constituted that the air stream after its passage through the filter 19 still retains such an overpressure as is necessary to blow the required quantity of air through the driving motors 10.

The other portion of the air stream, intended for the ventilation of the electrical machinery as well as the various operating compartments of the locomotive, requires further cleansing to the maximum possible degree to serve its intended function adequately. For this purpose, a plurality, for example six, readily accessible and interchangeable fine-mesh filter cells 26 are disposed in the shaft 18 beyond the diagonally positioned filter 19 in the direction of flow. For example, in the illustrative embodiment, the filter cells 26 comprise a part or all of the dividing wall between the shaft 18 and a pressure compartment 27, defined transversely the locomotive by walls 28 and 29. So as to control within predetermined limits the intermediate pressure created between filter 19 and the filter cells 26, as well as the ratio of division between the two main portions of the airstream, a plurality of choke or quantity determining vanes 39 are positioned adjacent the intake side of the filter cells 26, the vanes having appropriately dimensioned perforations, the size of which may be mechanically adjustable. Upon passage of the air stream through the filter cells, the overpressure of the stream thus reduces itself so as to be of the order of about ½ to 1 inch of water. As one result of the reduced overpressure, the convenient opening and closing of the passage doors 32 in the transverse walls 28 and 29 is not impeded to any appreciable extent.

From the pressure compartment 27 some of this portion of the air stream flows under its own pressure through the enclosing housing of generator 9 which extends, in the illustrative embodiment, into the engine compartment 31. Generator 9 is provided with the customary venting wheel, and the ventilating air passing therethrough is heated during such passage and ejected through the exhaust port 30 into the external atmosphere. The interior of generator 9 is provided with packing 9a at the generator housing end in the engine compartment, between the housing and the generator shaft, and thus the air stream passing through the generator and heated during the passage, cannot enter the diesel engine compartment 31. Packing 9a also prevents any air containing oil vapor escaping, particularly when the locomotive is stationary, from the interior of the engine compartment to the interior of the generator, where the oil vapors would attack the coils and insulation of the generator.

From the pressure compartment 27 furthermore, some of this portion of the air stream also flows under its own pressure to ventilate the engine compartment 31 and the operating engineer's cabin 37. For this purpose of ventilating the engine room, a rigid flap 33 is provided in the passage door 32 in wall 29, and a similar rigid flap 34 in this transverse wall 29. The flaps, or drop shutters 33 and 34, are swingingly mounted on the surface of the door, respectively the wall, facing the engine compartment at their upper edges, and thus automatically open toward the engine compartment 31 when the ventilating system is operating, that is, an over-pressure prevails within compartment 27, and automatically close against the door, respectively wall, on stoppage of the ventilating system when over-pressure no longer prevails in compartment 27.

The air comes out from the engine compartment 31 through roof turret shutters 40 which shutters 40 are closed automatically on stoppage of the ventilation system. In this way, a slightly increased pressure over and above the pressure of the external atmosphere continues to prevail in compartment 31 on stoppage, with the advantageous result that relatively no air, which has not been cleaned by passage through the filters, can penetrate from the external atmosphere by way of possible leaks in window or door closures, and thus the air enveloping the diesel engine may be kept substantially free of sand particles and other extraneous matter. Furthermore, the roof turret shutters 40 may be closed in groups so as to regulate the egress of air as required for the two directions of travel of the locomotive.

To ventilate the engineer's cabin 37, a further drop shutter 42, similar to flaps 33 and 34, is disposed in the lower portion of the surface of the intermediate wall 28 facing the cabin 37, which permits cleansed ventilating air to pass from the pressure compartment 27 into the cabin 37. This air does not freely flow from the cabin into the external atmosphere but rather through an opening 43 in the ceiling of the cabin 37 and a duct 44 to the intake 45 of the blower 15 in which intake there is a slightly decreased pressure as compared to the external atmospheric pressure. There is thus a closed path for the ventilating air passing through the engineer's cabin resulting in less new air having to be drawn into the system from the external atmosphere, and thus the soiling of filter cells 26 is correspondingly delayed. Further ventilation of the engineer's cabin is had by means of two nozzles 38, supplied with filtered ventilating air from the pressure compartment 27. These nozzles may be adjusted in direction as well as the amount of air ejected, and permit of the desirable facial and bodily cooling in hot climates for the engineer and his stand-by.

While there has been shown and described a preferred embodiment of the invention, it is understood that various changes and modifications can be made without departing from the scope and spirit of the invention.

What is claimed is:

1. Ventilating system adapted to furnish ventilating air of two degrees of purification in accordance with the requirements of different equipment and enclosures to be ventilated, comprising a blower adapted to draw in air with its contained extraneous matter from the external atmosphere, a main air duct connected to the blower, a first filter in the main duct adapted to strain the air taken into the lower of the two degrees of purification, a plurality of branch air ducts connected to the main air duct beyond the first filter, one of the branch ducts guiding a portion of the air stream to the equipment ventilatable by filtered air of the lower degree of purification, a second filter of fine mesh adapted to strain the air from the lower to the higher of the two degrees of purification positioned in the other branch duct, a pressure chamber connected to said other branch duct, auxiliary means connected to the pressure chamber for distributing air of the higher degree of purification to the other equipment and enclosures ventilatable thereby, and air outlet means connecting at least one of the enclosures ventilatable by air of the higher degree of purification to the intake side of the blower.

2. Ventilating system for a self-propelled mobile enclosure comprising a blower adapted to draw in air from the external atmosphere, filtering means cooperating with the blower and adapted to deliver two air streams of a lower and a higher degree of purification respectively, a plurality of objects to be ventilated, a first means for passing the air stream of the lower degree of purification to some of the objects of the plurality and thereafter expelling such stream to the external atmosphere, a second means for passing a portion of the stream of the higher degree of purification about others of the plurality of such objects and thereafter expelling such portion of such stream to the external atmosphere, and a third means for passing the remaining portion of the stream of the higher degree of purification about the remainder of the plurality of such objects and thereafter returning such remaining portion of such stream to the intake side of the blower.

3. Ventilating system particularly for internal combustion engine powered electrically driven locomotives comprising a blower adapted to draw in air from the external atmosphere, an air duct connected at one end to the blower and forming a pair of ducts at its other end, a first filtering means in the duct common to both ducts of the pair, a plurality of electric motors, one duct of the pair conducting the filtered air to and through the motors of the plurality, a second filtering element in the other duct of the pair, a pressure compartment connected to the latter duct beyond the second filtering element, an engineer's cabin separated from the pressure compartment by a common wall, outlets in the common wall adapted to be opened into the cabin under the pressure of air flow from the pressure compartment and to be closed in the absence of such pressure air flow, and an air outlet in the cabin connected to the intake side of the blower to cause circulation of ventilating air through the cabin.

4. Ventilating system according to claim 3 in which the locomotive has an enclosed engine compartment separated from the pressure compartment by the common wall, an electric generator having a housing extending from the pressure compartment through the common wall into the engine compartment, an air-tight packing sealing the interior of the generator end within the engine compartment against the air within the engine compartment, and an exhaust port connected to the generator housing for expelling to the external atmosphere the portion of the air passing from the pressure compartment through the generator.

ARNOLD WEBER.

References Cited in the file of this patent

UNITED STATES PATENTS

| Number | Name | Date |
| --- | --- | --- |
| 1,327,287 | Miller et al. | Jan. 6, 1920 |
| 2,476,368 | Guernsey | July 19, 1949 |
| 2,484,685 | Burdick et al. | Oct. 11, 1949 |

FOREIGN PATENTS

| Number | Country | Date |
| --- | --- | --- |
| 616,702 | France | Oct. 30, 1926 |
| 119,075 | Sweden | June 25, 1947 |
| 124,101 | Australia | Apr. 21, 1947 |